(12) United States Patent
Sarmiento Klapper et al.

(10) Patent No.: US 10,329,883 B2
(45) Date of Patent: Jun. 25, 2019

(54) IN-SITU NEUTRALIZATION MEDIA FOR DOWNHOLE CORROSION PROTECTION

(71) Applicant: Baker Hughes, a GE company, LLC, Houston, TX (US)

(72) Inventors: Helmuth Sarmiento Klapper, Hannover (DE); Zhiyue Xu, Cypress, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/712,981

(22) Filed: Sep. 22, 2017

(65) Prior Publication Data

US 2019/0093456 A1 Mar. 28, 2019

(51) Int. Cl.
| | |
|---|---|
| *E21B 41/02* | (2006.01) |
| *E21B 34/08* | (2006.01) |
| *C09K 8/54* | (2006.01) |
| *C01F 5/14* | (2006.01) |
| *C23F 15/00* | (2006.01) |
| *C23F 11/18* | (2006.01) |
| *C09K 8/03* | (2006.01) |

(52) U.S. Cl.
CPC ............ *E21B 41/02* (2013.01); *C01F 5/14* (2013.01); *C09K 8/032* (2013.01); *C09K 8/54* (2013.01); *C23F 11/18* (2013.01); *C23F 15/00* (2013.01); *E21B 34/08* (2013.01)

(58) Field of Classification Search
None
See application file for complete search history.

(56) References Cited

U.S. PATENT DOCUMENTS

| | | | | |
|---|---|---|---|---|
| 3,307,625 | A * | 3/1967 | Johnson | C09K 8/54 166/902 |
| 4,157,732 | A * | 6/1979 | Fonner | E21B 43/11 166/376 |
| 6,032,747 | A | 3/2000 | Moody et al. | |
| 6,131,657 | A * | 10/2000 | Keatch | C09K 8/528 166/244.1 |
| 7,343,972 | B2 | 3/2008 | Willingham et al. | |
| 8,631,876 | B2 | 1/2014 | Xu et al. | |

(Continued)

OTHER PUBLICATIONS

Salinas, Bobby J., et al., Controlled electrolytic metallics—An interventionless nanostructured platform, SPE 153428, Jun. 1-5, 2012.

*Primary Examiner* — Anuradha Ahuja
(74) *Attorney, Agent, or Firm* — Missman, Kumar & Tyler, P.C.

(57) ABSTRACT

Inhibiting or preventing corrosion of metallic components downhole may be accomplished by introducing neutralization media into a wellbore in the proximity of downhole metallic components, where the neutralization media comprises magnesium and where the method further includes subsequently contacting the neutralization media with a potentially corrosive environment comprising at least 5 volume % water, where the water has a pH of less than 11. This contacting activates the neutralization media with the water thereby releasing magnesium ions, and the magnesium ions react with hydroxyl ions of the water to give magnesium hydroxide in an amount effective to raise the pH of the water present to be between about 8 and 12 thereby inhibiting or preventing corrosion of metallic components downhole.

6 Claims, 2 Drawing Sheets

(56) References Cited

U.S. PATENT DOCUMENTS

| | | |
|---|---|---|
| 8,739,876 B2 | 6/2014 | Saini et al. |
| 9,079,246 B2 | 7/2015 | Xu et al. |
| 9,090,955 B2 | 7/2015 | Xu et al. |
| 9,682,425 B2 | 6/2017 | Xu et al. |
| 2002/0160919 A1 | 10/2002 | Stowe et al. |
| 2004/0159149 A1* | 8/2004 | Williams ............... E21B 47/011 73/152.23 |
| 2007/0181224 A1* | 8/2007 | Marya .................... C09K 8/805 148/400 |
| 2008/0049544 A1 | 2/2008 | Bingham et al. |
| 2009/0078153 A1 | 3/2009 | Shchukin et al. |
| 2011/0073307 A1* | 3/2011 | Miller ..................... E21B 27/00 166/268 |
| 2011/0137465 A1* | 6/2011 | Angelilli ................. C02F 1/763 700/271 |
| 2011/0315444 A1* | 12/2011 | Trinh ...................... E21B 10/00 175/40 |
| 2012/0015852 A1 | 1/2012 | Quintero et al. |
| 2012/0091396 A1 | 4/2012 | Setlur et al. |
| 2013/0087328 A1* | 4/2013 | Maida, Jr. ............. E21B 47/123 166/250.05 |
| 2014/0172302 A1* | 6/2014 | Kalia ...................... E21B 47/10 702/6 |
| 2015/0021200 A1* | 1/2015 | Sun ......................... C23F 13/10 205/730 |
| 2016/0160113 A1 | 6/2016 | Nguyen et al. |

\* cited by examiner

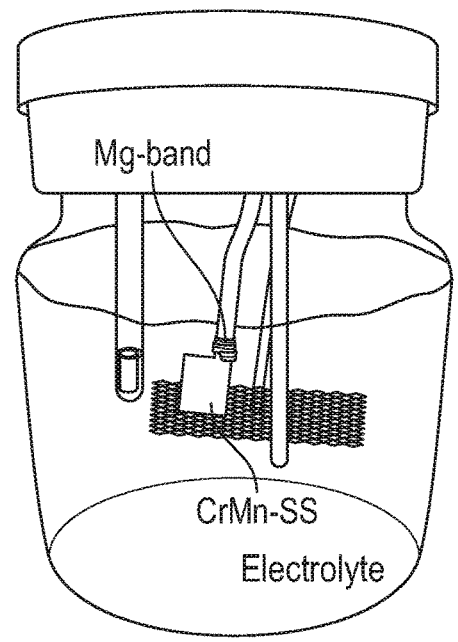
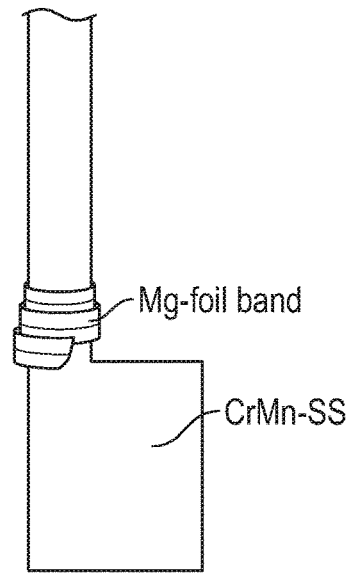
FIG. 4A
FIG. 4B
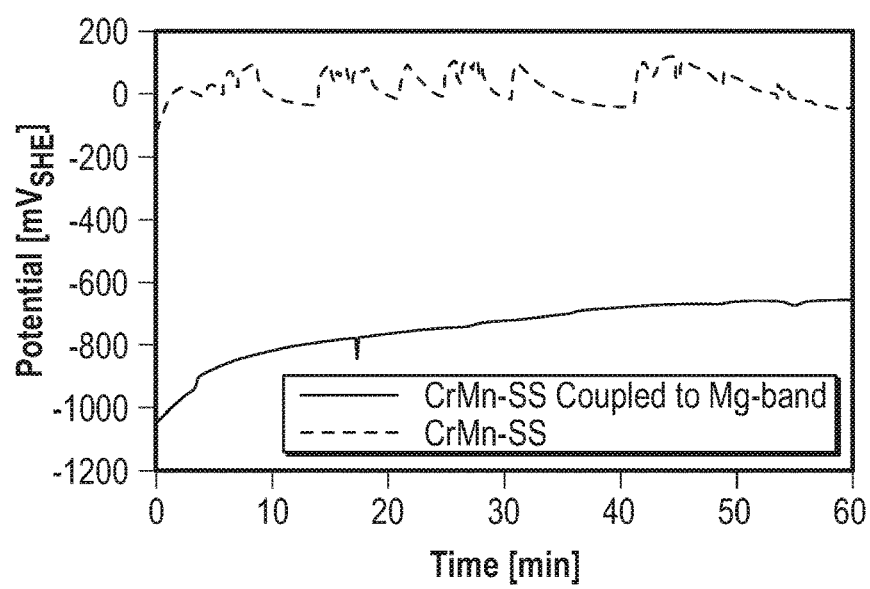
FIG. 5

IN-SITU NEUTRALIZATION MEDIA FOR DOWNHOLE CORROSION PROTECTION

TECHNICAL FIELD

The present invention relates to methods of inhibiting and/or preventing the corrosion of structural components downhole during hydrocarbon recovery operations, and more particularly relates, in one non-limiting embodiment, to methods of inhibiting and/or preventing the corrosion and degradation of materials downhole in-situ.

TECHNICAL BACKGROUND

With the continued increase in oilfield operations with demanding service conditions, mainly characterized by high temperature (HT) and extreme corrosive environments like those containing large halide concentrations and/or corrosive gases like $CO_2$ and $H_2S$, the reliability and service life of downhole equipment is significantly affected. Downhole fluids such as drilling, completion, production, and stimulation fluids might be detrimental to the integrity of the majority of materials used in subsurface engineering equipment. Materials degradation mechanisms in aqueous environments including corrosion strongly depend upon chemical speciation, pH and temperature of the environment. It is well known that acidic conditions (defined herein as a pH equal to or less than 6) may increase dramatically the corrosion susceptibility of metallic materials including cemented tungsten carbides, steels, aluminum, copper and cobalt alloys.

In further detail, downhole fluids might contain large concentrations of halides such as chlorides or bromides. Alternatively or additionally, these fluids might become contaminated with corrosive gases like $H_2S$ and $CO_2$. Having low pH, these fluids can, therefore, be very detrimental to different materials. On the other hand, it has been proven that high pH reduces significantly the corrosion susceptibility of metallic materials when exposed to high-salinity and $H_2S$-bearing downhole environments. To address this problem, corrosion inhibitors and scavengers are routinely added to the oilfield fluids to reduce or prevent the corrosion caused by dissolved acidic gases. However, continuous corrosion control via chemical treatment (inhibitor injection) during production is very costly. On the other hand, the dosing of inhibitors and pH-adjustment controlled by sporadic measurements on the surface introduces a time delay that reduces the effectiveness of the corrosion inhibitors. Additionally, corrosion inhibitors injected from the surface can be diluted during transportation to the area in the wellbore where increased corrosion inhibition is necessary. Therefore, these conventional methods increase the risk of failure due to quick unforeseen excursions from the operational window.

It would thus be desirable to provide methods and apparatus to that could increase the inhibition and/or prevention of corrosion in-situ when and as needed downhole.

SUMMARY

There is provided in one non-restrictive version, a method for inhibiting or preventing corrosion of metallic components downhole, where the method involves introducing neutralization media into a wellbore in the proximity of downhole metallic components, the neutralization media comprising magnesium, contacting the neutralization media with a potentially corrosive environment comprising at least 5 volume % water, where the water has a pH of less than 12, alternatively less than about 11, activating the neutralization media with the water and releasing magnesium ions, and reacting the magnesium ions with hydroxyl ions of the water to give magnesium hydroxide in an amount effective to raise the pH of the water present to be between about 8 and 12 thereby inhibiting or preventing corrosion of metallic components downhole.

There is additionally provided in another non-limiting embodiment a system for inhibiting or preventing corrosion of metallic components downhole, where the system includes a wellbore neutralization media comprising magnesium, a sensor configured to sense a parameter change in a potentially corrosive fluid comprising at least 5 volume % water, where the parameter change is selected from the group consisting of detecting the pH of the potentially corrosive fluid falling below about 8, detecting the presence of $H_2S$, detecting the presence of $CO_2$, detecting an oxygen concentration increase, detecting a change in the concentration of a particular, predetermined species, detecting a temperature increase, above a pre-set threshold, and combinations of these, and a mechanism such as a control valve configured to allow the contact of the wellbore neutralization media with the potentially corrosive fluid in response to the sensor sensing the parameter change.

BRIEF DESCRIPTION OF THE DRAWINGS

FIG. 4A is a photograph of an electrochemical set-up for testing the pitting corrosion susceptibility of a CrMn-SS coupon or sample in a Cl-containing solution at 80° C.;

FIG. 4B is an enlarged photograph of the CrMn-SS coupon of FIG. 4A showing the Mg-foil band wrapped above it; and FIG. 5 is a graph of electrochemical potential as a function of time for the CrMn-SS in the Cl-containing solution at 80° C. of FIGS. 4A and 4B.

Figure 1:
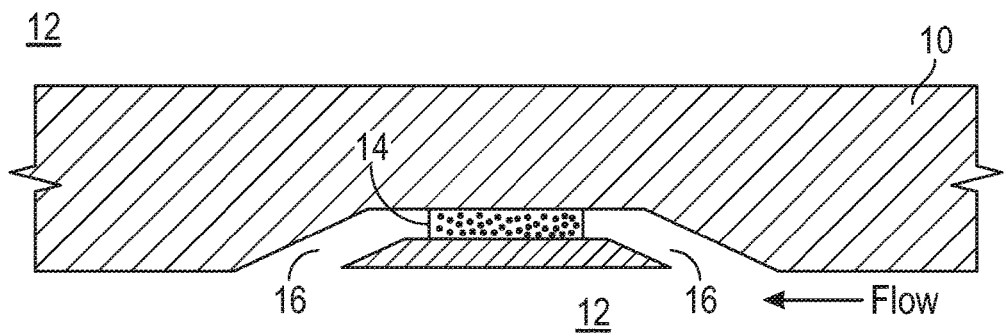
FIG. 1 is a schematic illustration of a cross-section of a downhole tool having neutralization media within a flow pathway in the tool.

It will be appreciated that the various Figures are not necessarily to scale and that certain features have been exaggerated for clarity and do not necessarily limit the features of the invention. For instance, the sizes of the neutralization media relative to other components are exaggerated to illustrate the methods and apparatus described herein.

DETAILED DESCRIPTION

Downhole corrosion mechanisms, such as uniform and pitting corrosion as well as environmentally-assisted cracking, strongly depend upon pH. Several failure analysis of downhole equipment have shown that pH excursions from the operational window to lower pH values outside the operational window the equipment is specified for due to chemical changes in the formation and/or lack of chemical treatment control were the root cause for downhole failures or significant damage of assets leading to costly nonproductive time (NPT) and high scrap and repair costs. A corrosion protection method has been discovered based on an in-situ chemical agent (neutralization media) that can be optionally controlled by a sensor. This system and method are proposed to address the very costly, but unfortunately common, corrosion damage that drilling, completion and production equipment experience during downhole service. The optional sensor may trigger activating the neutralization media based on, but not necessarily limited to, a change in pH, to the release of $H_2S$ and/or $CO_2$, to change in temperature and/or to change in one or more chemical particular species in the downhole fluid in contact with the equipment, for instance detecting an oxygen concentration increase. Predetermined species whose presence or concentration could be detected include, but are not necessarily limited to, metallic ions, inorganic salts, tracers, etc.

In further detail, a system is provided based on a self-consuming chemical agent that is activated by changes in the chemical composition of the fluid, or via surface detection, and/or by using downhole sensors, for corrosion control in downhole applications. The described corrosion protection system brings advantages for controlling unforeseen chemical changes in downhole environments during drilling and production operations with the solution provided in-situ, therefore, avoiding the time delay produced when corrosion protection is controlled via additives at the surface.

The neutralization media comprises magnesium, in one non-limiting embodiment a magnesium (Mg) alloy with and no more than about 10% by mass of one or more alloying elements or controlled electrolytic metallic (CEM) nanostructured material, which dissolves when in contact with the downhole fluid, as described in further detail below. Magnesium ions ($Mg^{+2}$) produced by anodic dissolution (Equation 1) react with hydroxide-ions from water to $Mg(OH)_2$ increasing the pH of the downhole fluid (Equation 2), thus reducing its corrosivity.

$$Mg \rightarrow Mg^{+2} + 2e^- \qquad (1)$$

$$Mg^{+2} + 2OH^- \rightarrow Mg(OH)_2 \qquad (2)$$

Magnesium passivates at a pH of greater than or equal to 12, but it corrodes in aqueous environments with a pH of less than about 11. Therefore, it delivers protection in a broad regime of downhole conditions. The chemical stability (thermodynamic and kinetic) of the neutralization media can thus be adjusted by modifying its chemical composition, for instance, by additions of zinc (Zn), aluminum (Al), and/or manganese (Mn) to the Mg-matrix.

When introduced into a fluid, for instance a downhole fluid such as a drilling fluid, the neutralization media can be self-activated. That is, upon contact with a potentially corrosive fluid it releases magnesium ions, $Mg^{+2}$, which reacts to $Mg(OH)_2$ by equation (2). Alternatively, the neutralization media could also be stored and released by an activation signal, such as a signal to a flow valve, using sensors such as a pH sensor, a $H_2S$ sensor, a $CO_2$ sensor, a $O_2$ sensor, a chemical sensor, an electrical conductivity sensor or a temperature sensor, or combinations thereof, placed at the surface and/or downhole. These sensors would have been previously programmed for a particular operational window. Once the sensor detects a deviation in the monitored fluid property, pH for instance, from the pre-established operation window, in one non-limiting embodiment a pH of equal to or less than 5, a mechanical system, for instance one including a control valve, a flow valve, or other valve, enables releasing the neutralization media which reacts with the downhole fluid leading, as previously described, to an increase in the pH.

As defined herein, a potentially corrosive fluid also includes a corrosive fluid. The fluid may be potentially corrosive when prolonged contact of a metallic component with the fluid will result in corrosion of the metal component. The metallic component may be made of an iron-based alloy, a steel, a stainless steel, a nickel alloy, a copper alloy, a cobalt alloy, titanium alloys and mixtures thereof, including, but not necessarily limited to, downhole tools, tubular goods, screens, valves, casings, and the like, susceptible to corrosion in an aqueous acidic environment. In one non-limiting embodiment, the potentially corrosive fluid may be water, brine, or a non-aqueous fluid such as oil that comprises at least 5 volume % water, where the water has a pH of less than about 11, alternatively a pH of less than about 10, in another non-restrictive version, a pH of less than about 9, in another non-limiting embodiment a pH of less than about 8, and optionally a pH of less than about 7. In one non-limiting embodiment, a lower pH limit can be defined within the acidic region (pH<6); in a non-limiting example as a pH of about 5, alternatively a pH of about 4, in another non-restrictive version a pH of about 3, and optionally a pH of about 2.

The neutralization media downhole should be in proximity of the metallic components, where proximity is defined herein as physically close enough for the neutralization media, upon being activated, inhibits or prevents corrosion of the metallic components. Alternative, the neutralization media could be placed at a significant distance from the metallic component to be protected but the inherent time delay is sufficient to guarantee the integrity of the component. This would still be within the definition of "proximity" as used herein.

The neutralization media that contains magnesium may comprise a variety of physical forms, including, but not necessarily limited to, controlled electrolytic metallics (CEM), additive manufacturing, conventional casting, magnesium alloy, and combinations thereof. CEM technology is described in U.S. Pat. Nos. 8,631,876, 9,079,246, 9,090,955, and 9,682,425, all of which are incorporated herein by reference in their entireties. Magnesium or other reactive materials could be used in neutralization media, for instance, magnesium, aluminum, zinc, manganese, molybdenum, tungsten, copper, iron, calcium, cobalt, tantalum, rhenium, nickel, silicon, rare earth elements, and alloys thereof and combinations thereof. In one non-limiting embodiment, the CEM nanostructured material is at least 90 wt %. This helps guarantee the chemical activity in a broad range of pH values. The alloys may be binary, tertiary or quaternary alloys. As used herein, rare earth elements include Sc; Y; lanthanide series elements, including La, Ce, Pr, Nd, Pm, Sm, Eu, Gd, Te, Dy, Ho, Er, Tm, or Lu; or actinide series elements, including Ac, Th, Pa, U, Np, Pu, Am, Cm, Bk, Cf, Bk, Cf, Es, Fm, Md, or No; or a combination of rare earth elements. These metals may be used as pure metals or in any combination with one another, including various alloy combinations of these materials, including binary, tertiary, or quaternary alloys of these materials. Nanoscale metallic and/or non-metallic coatings could be applied to these electrochemically active metallic neutralization media to further strengthen the material and to provide a means to accelerate or decelerate the disintegrating rate. Disintegrative enhancement additives include, but are not necessarily limited to, magnesium, aluminum, nickel, iron, cobalt, copper, tungsten, rare earth elements, and alloys thereof and combinations thereof. It will be observed that some elements are common to both lists, that is, those metals which can form disintegrative metals and disintegrative metal compacts and those which can enhance such metals and/or compacts. The function of the metals, alloys or combinations depends upon what metal or alloy is selected as the major composition or powder particle core first. Then the relative disintegrative rate depends on the value of the standard potential of the additive or coating relative to that of the core. For instance, to make a relatively more slowly disintegrating core, the additive or coating composition needs to have lower standard potential than that of the core. An aluminum core with a magnesium coating is a suitable example. Or, to make this core dissolve faster, standard potential of the core needs to be lower than that of coating. An example of this latter situation would be a magnesium particle with a nickel coating.

These electrochemically active metals or metals with nanoscale coatings can be very reactive with a number of common wellbore fluids, including any number of ionic fluids or highly polar fluids. Examples include fluids comprising sodium chloride (NaCl), potassium chloride (KCl), hydrochloric acid (HCl), calcium chloride ($CaCl_2$), sodium bromide (NaBr), calcium bromide ($CaBr_2$), zinc bromide ($ZnBr_2$), potassium formate, or cesium formate.

Additive manufacturing (AM) includes, but is not necessarily limited to, 3D Printing, Rapid Prototyping (RP), Direct Digital Manufacturing (DDM), layered manufacturing and additive fabrication. Stereolithography (SLA), 3-D Printing (3DP), Multi-Jet Modeling (MJM), Fused Deposition Modeling (FDM), Selective Laser Sintering (SLS), and the like.

Figure 2:
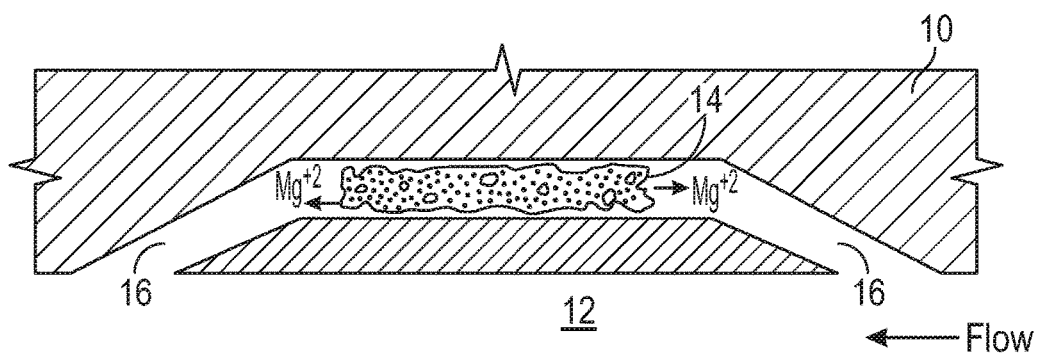
FIG. 2 is an enlarged schematic illustration of the cross-section of the downhole tool of FIG. 1 schematically illustrating the release of magnesium ions from the neutralization media.

One non-limiting embodiment is shown in FIG. 1 in the form of a downhole tool 10, shown in cross-section, within an aqueous fluid 12, which tool 10 bears neutralization media 14 in a flow channel 16. It will be appreciated that by "downhole" is meant within a wellbore of a subterranean well used in any respect for the recovery of hydrocarbons, including but not necessarily limited to, oil and gas. If the pH of the fluid 12 is at or above the target pH for the fluid, then the physical integrity of the neutralization media 14 remains. However, if the pH of the fluid 12 goes below the target pH for the fluid 12, then the neutralization media 14 is activated by the more acidic water and magnesium ions $Mg^{+2}$ are released as shown in FIG. 2 which is an enlarged schematic illustration of the cross-section of the downhole tool of FIG. 1. The integrity of the neutralization media 14 is shown as compromised since the $Mg^{+2}$ ions are leaving and then reacting with the hydroxyl ions of the aqueous fluid 12 as shown in Equation (2) above and the pH of the fluid 12 increases again to at or above the target pH. It will be appreciated that there is no delay in the local increase in the pH to address an excursion from the pH operational window. When the neutralization media 14 is consumed, the downhole tool 10 may be swapped out for one containing fresh neutralization media 14.

Figure 3:
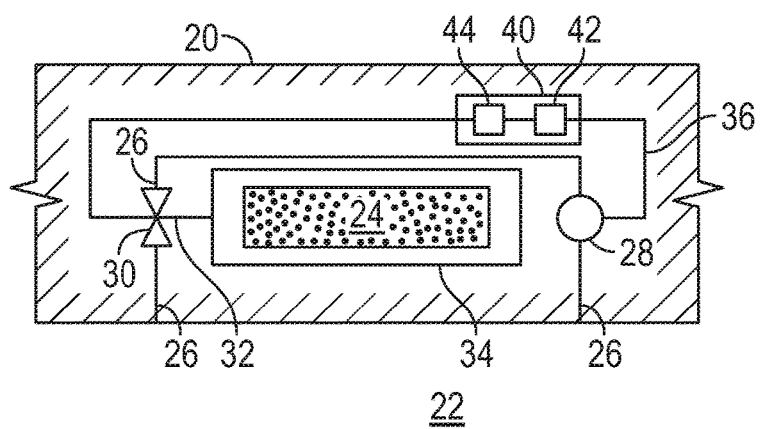
FIG. 3 is a schematic illustration of a cross-section of a different downhole tool than FIG. 1, having neutralization media within a flow pathway in the tool, where flow to the neutralization media is controlled by a sensor.

Shown in FIG. 3 is a schematic illustration of a cross-section of a different downhole tool 20 surrounded by a fluid 22 having at least 5 vol % water, where the tool 20 has neutralization media 24 within a flow pathway 26 in the tool (in a non-limiting embodiment within a cavity 34), where flow to the neutralization media 24 is controlled by a sensor 28. Sensor 28 monitors the fluid 22 in flow pathway 26 for predetermined triggering events, including, but not necessarily limited to, detecting the pH of the potentially corrosive fluid falling below about 8, detecting the presence of $H_2S$, detecting the presence of $CO_2$, detecting a temperature increase above a pre-set threshold, or combinations of these, and via control line 36 that causes valve 30 to open so that fluid 12 flows through conduit 32 to contact neutralization media 24 to activate or react with it and release magnesium ions as previously described. In more detail, control line 36 is connected to sensor output receiving module 42 within controlling system 40 that has control logic that operates valve control module 44 which in turn actuates valve 30. It will be appreciated that the sensor 28, sensor output receiving module 42, control line 36, controlling system 40 and/or valve control module 44 may optionally be partially or completely in a location different from downhole tool 20, in a non-limiting embodiment on the surface or other location that is not downhole. In a non-restrictive version, the valve 30 could be activated via downlink from the surface by sensing also at the surface.

It will be appreciated that the method and apparatus described herein improves the reliability of downhole equipment by reducing the risk of NPT or workover costs related to corrosion. They extend the service life and operational limits of downhole tools. Further, they reduce overall capital costs for downhole tools since they enable the use of less expensive materials in harsh environments where cost prohibitive Ni-alloys may be preferred due to superior corrosion resistance.

EXAMPLE 1

A proof-of-concept experiment using a stainless steel coupon in a brine at 80° C. demonstrated that Mg-dissolution reduces the pitting susceptibility of the steel. More specifically, a laboratory examination conducted using a coupon of a CrMn-Stainless steel (SS) typically used as structural material in drill string components confirmed that when galvanically coupled to a Mg-foil band it was protected from corrosion. In the test set-up shown in FIGS. 4A and 4B, a Mg-foil band was wrapped around one CrMn-SS sample and immersed in 80,000 mg/L Cl-containing solution of near-neutral pH at 80° C. (electrolyte). The electrochemical potential of the specimen was monitored during 60 minutes. A second sample of the same CrMn-Stainless steel was also tested in a separate experiment.

The SS-sample that was galvanically coupled to the Mg-band in this experiment showed initially a potential close to $-1000$ $mV_{SHE}$. The potential drifted with time to a value close to $-700$ $mV_{SHE}$ (the lower line in FIG. 5). The potential of the SS-sample without the Mg-band was much more noble ($-100$ $mV_{SHE}$). After the potential reached 0 $mV_{SHE}$ potential transients related to pit initiation and propagation were discerned (the upper line in FIG. 5). The SS-specimen coupled to the Mg-band did not show any corrosion damage after the test. In contrast, the unprotected specimen has shown several pits at the surface. Pit depths observed on the unprotected samples were between 30 and 120 μm. The pH of the Cl-containing solution used for testing the unprotected specimen did not change. In contrast, the solution where the SS-specimen was galvanically coupled to the Mg-foil had a pH of 8.6 at the end of the test. Thus, this experiment confirms the increase in pH by the Mg-dissolution. Even though the direct galvanic coupling can be seen as the major contributor to the reduction of the pitting susceptibility of the stainless steel in the brine, the increase of the pH also contributed to the final result.

It will be appreciated that the neutralization media comprising magnesium is similar or analogous to the magnesium element of U.S. patent application Ser. No. 15/680,877 filed Aug. 18, 2017, incorporated herein by reference in its entirety, in that ions are released to inhibit or prevent corrosion.

In the foregoing specification, the invention has been described with reference to specific embodiments thereof, and has been demonstrated as effective in providing methods and apparatus for inhibiting or preventing corrosion of metallic components downhole. However, it will be evident that various modifications and changes can be made thereto without departing from the broader scope of the invention as set forth in the appended claims. Accordingly, the specification is to be regarded in an illustrative rather than a restrictive sense. For example, specific combinations of metals, neutralization media, brines, downhole tools, proportions and other components and conditions falling within the claimed parameters, but not specifically identified or tried in a particular method, with a particular metal, or aqueous fluid, are anticipated to be within the scope of this invention. Similarly, it is expected that the corrosion prevention and inhibition methods may be successfully practiced using somewhat different method steps, temperature ranges, and proportions than those described or exemplified herein.

The present invention may suitably comprise, consist of or consist essentially of the elements disclosed and may be practiced in the absence of an element not disclosed. For instance, there may be provided a method for inhibiting or preventing corrosion of metallic components downhole, where the method consists essentially of or consists of introducing into a wellbore neutralization media comprising magnesium, contacting the neutralization media with a potentially corrosive fluid comprising at least 5 volume % water, where the water has a pH of less than 11, activating the neutralization media with the water and releasing magnesium ions, and reacting the magnesium ions with hydroxyl ions of the water to give magnesium hydroxide in an amount effective to raise the pH of the water present to be between about 8 and 12 thereby inhibiting or preventing corrosion of metallic components downhole.

There is further provided a system for inhibiting or preventing corrosion of metallic components downhole, where the system consists essentially of or consists of a wellbore neutralization media comprising magnesium, a sensor configured to sense a parameter change in a potentially corrosive fluid comprising at least 5 volume % water, where the parameter change is selected from the group consisting of detecting the pH of the potentially corrosive fluid falling below about 8, detecting the presence of $H_2S$, detecting the presence of $CO_2$, detecting a temperature increase above a pre-set threshold, and combinations of these, and a valve configured to contact the wellbore neutralization media with the potentially corrosive fluid in response to the sensor sensing the parameter change.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for inhibiting or preventing corrosion of metallic components downhole, the method comprising:
    introducing neutralization media into a wellbore in proximity of the downhole metallic components, the neutralization media comprising magnesium and where the neutralization media is selected from the group consisting of controlled electrolytic metallic (CEM) nanostructured material, media produced by additive manufacturing, and combinations thereof, where the additive manufacturing is selected from the group consisting of three-dimensional (3D) printing, rapid prototyping, direct digital manufacturing, layered manufacturing, stereolithography, multi-jet modeling, fused deposition modeling and selective laser sintering;
    sensing a parameter change in a corrosive fluid by a sensor, which sensor initiates contacting the neutralization media with the corrosive fluid, where the corrosive fluid comprises water, where the water has a pH of less than about 11; where the parameter change is selected from the group consisting of detecting the pH of the corrosive fluid falling, detecting a presence of $H_2S$, detecting a presence of $CO_2$, detecting a temperature increase above a pre-set threshold, detecting an oxygen concentration increase, detecting a change in the concentration or presence of a predetermined species above a pre-set threshold, detecting an increase in electrical conductivity above a pre-set threshold, and combinations of these;
    activating the neutralization media with the corrosive fluid and releasing magnesium ions; and
    reacting the magnesium ions with hydroxyl ions of the water to give magnesium hydroxide in an amount effective to raise the pH of the water present to be between about 8 and 12 thereby inhibiting or preventing corrosion of the metallic components downhole.

2. The method of claim 1 where the neutralization media is contained on or within a downhole tool in the wellbore.

3. The method of claim 1 where the activating the neutralization media comprises dissolving the neutralization media in the water present.

4. A method for inhibiting or preventing corrosion of metallic components downhole, the method comprising:
    introducing neutralization media into a wellbore in proximity of the downhole metallic components, the neutralization media comprising magnesium, where the neutralization media is selected from the group consisting of controlled electrolytic metallic (CEM) nanostructured material, media produced by additive manufacturing, and combinations thereof, where the additive manufacturing is selected from the group consisting of three-dimensional (3D) printing, rapid prototyping, direct digital manufacturing, layered manufacturing, stereolithography, multi-jet modeling, fused deposition modeling and selective laser sintering;

sensing a change in a corrosive fluid in the wellbore by a sensor, which sensor initiates contacting the neutralization media with the corrosive fluid, where the corrosive fluid comprises water, where the water has a pH of less than 11; where the sensor initiates the contacting upon sensing a parameter change selected from the group consisting of detecting the pH of the corrosive fluid falling, detecting a presence of $H_2S$, detecting a presence of $CO_2$, detecting a temperature increase above a pre-set threshold, detecting an oxygen concentration increase, detecting a change in the concentration or presence of a predetermined species above a pre-set threshold, detecting an increase in electrical conductivity above a pre-set threshold, and combinations of these;

contacting the neutralization media with the corrosive fluid;

activating the neutralization media with the water and releasing magnesium ions; and reacting the magnesium ions with hydroxyl ions of the water to give magnesium hydroxide in an amount effective to raise the pH of the water present to be between about 8 and 12 thereby inhibiting or preventing corrosion of the metallic components downhole.

5. The method of claim 4 where the neutralization media is contained on or within a downhole tool in the wellbore.

6. The method of claim 4 where the activating the neutralization media comprises dissolving the neutralization media in the water present.

\* \* \* \* \*